June 13, 1967 M. A. RIFCHIN 3,324,506
APPARATUS FOR CURING RETREAD TIRES
Filed April 26, 1965

United States Patent Office 3,324,506
Patented June 13, 1967

3,324,506
APPARATUS FOR CURING RETREAD TIRES
Marvin A. Rifchin, 59 Longfellow Road,
Watertown, Mass. 02172
Filed Apr. 26, 1965, Ser. No. 450,845
6 Claims. (Cl. 18—2)

This invention relates to curing retread tires, and more particularly, to a means for conducting the curing cycle more efficiently and hence, more economically.

Since pressure, in addition to heat, is a controlling factor in achieving optimum bonding of the retread material, operation in accordance with this invention utilizes an external mold and an internal pressure vessel between which the retread tire is held under pressure during the curing cycle. The external mold is a conventional two-part separable steam jacketed mold, while the pressure vessel is an inflatable toroidal bag.

While such bags have heretofore been used inflated with air, with or without the inclusion of electrical heating elements, inflation thereof with steam for applying heat has been regarded as impractical, both because what was thought to be permissible internal steam temperature could not provide sufficient pressure and also because condensate formed in the inflatable bag and collected in pools, which affected the uniformity of application of heat. It has thus been suggested that the inflatable bag be pre-heated with low pressure steam before it is inserted in the external mold and that the steam and condensate then be replaced with air under pressure after it has been inserted in the mold. See U.S. Patent No. 3,127,460.

In accordance with this invention, a common heating medium in the form of live steam is used for both the external mold and the pressure vessel without encountering non-uniformity in interface temperature due to condensate accumulation in the vessel or otherwise, by utilizing a two stem inflatable bag as the pressure vessel, one stem forming an entry for high pressure live steam, and the other forming an outlet for mixed condensate-steam. With this operation, the live steam may be supplied from a common high pressure source to both the mold and the internal bag with a reducing valve in the conduit leading to the external mold so that the internal carcass surface will receive heat originating from higher temperature steam in the bag than the temperature of the steam in the external mold.

Because, however, as stated in said patent, the maximum desirable temperature of the steam corresponds to a pressure less than that desired to initially compress the components, the bag, in accordance with this invention, is initially inflated with air to procure the desired initial squeeze pressure, namely above 75 pounds and usually nearer 150 pounds, and thereafter, it is replaced with steam without letting the internal pressure drop below a minimum sufficient to maintain the tire firmly pressed against the external mold during the transition.

Suffice it to say then, in contrast to statements made by an experienced company in Patent No. 2,929,909, consistently satisfactory results have been secured with the use of the technique of this invention with curing cycles reduced up to 50% or more of their duration when air alone is used for internal bag inflation.

The above and other objects of the invention will be more fully understood when taken in connection with the following description of a typical system and method of this invention given in connection with the accompanying drawings wherein.

Figure 1:
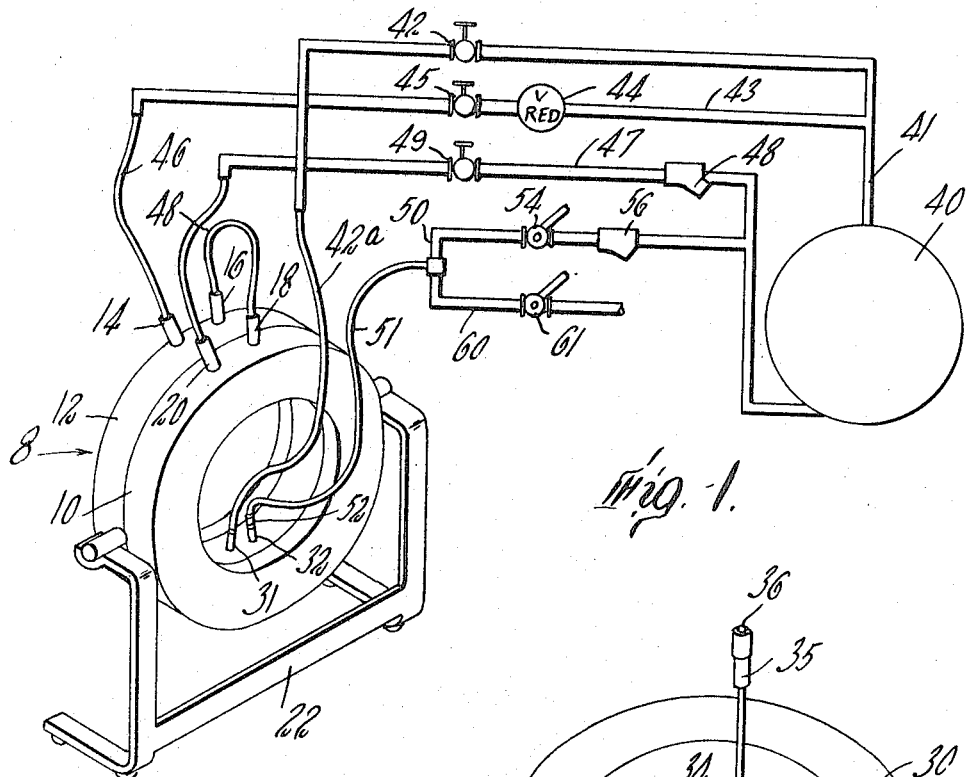
FIG. 1 is a diagramamatic representation of a steam delivery and return conduit system connected in curing relation to a tire mold supported on a dolly.
Figure 3:
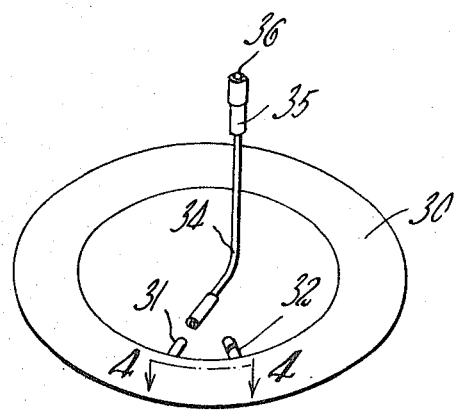
FIG. 3 is a view of a two stem inflatable bag utilized in the system of FIGS. 1 and 2.
Figure 2:
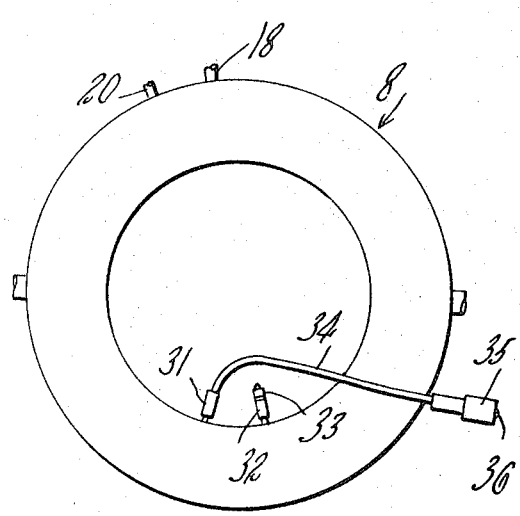
FIG. 2 is an elevational view of the mold prior to being connected to the steam delivery and exhaust system.

FIG. 1 shows an external steam jacketed tire mold 8 of conventional construction and separable sections 10 and 12. Section 12 has a valve inlet stem 14 and a valve outlet stem 16. Section 10 has a valve inlet stem 18 and a valve outlet stem 20.

The composite mold 8 is supported by trunions on a portable dolly 22 for pivotal movement.

Seated inside the tire carcass is an inflatable bag 30 provided with an open unvalved inlet stem 31 and outlet stem 32 having a check valve 33.

As an accessory, there is provided a short flexible hose connector 34 which has quick couplers at both ends and contains a check valve 36. This accessory is adapted to be coupled to the inlet stem 31 of the bag 30 during inflation of the bag from a source of air provided through an air supply line having a terminal coupler engageable with coupler 35 of the accessory 34.

A boiler 40 has a steam delivery main conduit 41 leading through a hand valve 42 to a flexible connection 42a having a terminal quick coupler adapted to be coupled to the inlet stem 31 of bag 30.

A branch steam delivery conduit 43 leads off of conduit 41 through a pressure-reducing valve 44 and hand valve 45 to a flexible hose 46 having a terminal coupler adapted to be coupled to the inlet stem 14 of the external mold. A return conduit 47 to boiler 40 is connected to outlet stem 20. A jumper line 48 interconnects the other two stems 16 and 18 of the external mold 8. All of stems 14, 16, 18 and 20 have check valves mechanically opened by engagement of the couplers as is conventional in the art.

Conduit 47 has a steam trap 48 for maintaining steam pressure in the external mold and a hand valve 49.

A steam return conduit 50 leading to boiler 40 is connected to outlet stem 32 through a flexible hose 51 and a valve-opening quick coupler 52. Interposed in return line 50 is another quick-acting hand valve 54 and a steam trap 56.

A branch exhaust conduit 60 leads from conduit 50 to atmosphere through a hand valve 61.

Figure 4:
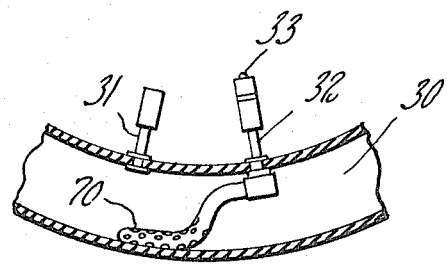
FIG. 4 is a cross-sectional view taken along the line 4—4 of FIG. 3.

The internal structure of the inflatable bag is shown in FIG. 4 and includes an apertured flexible metal hose 70 communicating with outlet valve stem 32. The hose is sufficiently limpid so that when the assembly is mounted, as shown in FIG. 1, with the outlet valve stem at the bottom, the hose 70 will sag to the bottom of the bag in a position to pick up pooled condensate.

In operation, therefore, one of the bags 30 is positioned in a tire carcass to which has already been applied a tread rubber in the usual manner. The inserted bag is usually overlayed with a sectionalized collapsible rim as is known in the art. The dolly 22 of FIG. 1 is moved to apparatus for opening the external mold in a manner known to the art for the insertion of the carcass between the two separated portions of the external mold, and for closing the mold portions on the retread tire. This is normally done with the tire parts in a horizontal position. Before this mold closing operation, the bag is connected by the conector 34 to a source of air supply and after closing and locking the external mold, the bag is inflated to a pressure of up to about 150 p.s.i. The air supply line is then uncoupled, the air being retained in the bag by the check valve 36 attached to the inlet stem and by the check valve in the outlet stem 32.

The dolly is then moved to a location within reach of the flexible connections of the steam supply system and the external mold is connected in the usual manner with the jumper line 48 from the outlet stem 16 of one section to the inlet stem 18 of another section and to steam delivery conduit 43 and exhaust conduit 47. Reducing valve 44 may be set to deliver steam at 40 to 60 pounds pressure to the external mold (287–307° F.).

The connector 34 is disconnected from inlet stem 31 of inflatable bag 30 and as quickly as possible is replaced with the connection to the high steam delivery conduit 41 (valve 42 being closed) before allowing enough air to escape from the bag to lower its internal pressure below as a minimum 50 pounds p.s.i. Usually only enough air escapes to lower the internal pressure slightly below the steam pressure in line 42a.

Exhaust conduit 50 is then coupled to outlet stem 32 of bag 30 with valve 61 in the atmosphere exhaust conduit 60 open. As quickly as possible after the exhaust connection is made, valve 42 is opened to permit the steam to flush the air and resulting condensate out of the bag without lowering the pressure below 50 pounds p.s.i. After five or six seconds, the valve 61 is closed and the steam pressure in the bag comes to an equilibrium with that in the pressure delivery conduit. Valve 54 is then opened so that condensate is thereafter continuously driven out through the open valve 54 to steam trap 56 which bleeds condensate back to boiler 40. The applied internal temperature stabilizes at 298–350° F. (50–135 p.s.i.), depending upon the delivery conduit pressure selected for a particular operation.

Meanwhile, the external mold is heated by the steam at the lowered temperature of about 287–307° F.

During the curing cycle, tests show that the interface between the retarded material and a normal carcass is maintained at a temperature at least equal to, and usually above, the external mold temperature. The curing readily takes place within a period of about 30 minutes for a typical passenger car tire with tread rubber gauges up to 20/32 of an inch. Preferred temperatures are 300° F. for the mold and 350° F. for the pressure vessel 30.

After completion of the curing cycle, the following operation takes place: Close valve 42. Open valve 61 to exhaust bag pressure. Disconnect all couplings to the steam system. The mold is then returned to the mold-opening apparatus for removal of the cured tire and replacement with an uncured tire to repeat the operation.

While stems 31 and 32 have been shown closely adjacent to one another, it will be apparent that inlet stem 31 may be at any point in the inner periphery of the bag so long as outlet stem 32 is at the lowest point during the cure. In the case of a clam shell mold where the curing is done almost in horizontal position, the outlet stem 32 should likewise be at the lowest point.

In general, the internal pressures used in horizontal curing may be less because additional pressure is required to support the weight of the tire and rim assembly when it is in a vertical position.

What is claimed is:

1. Apparatus for retreading tires comprising an external mold and an internal pressure vessel adapted to receive a retread tire therebetween, inlet and outlet stems on both said mold and said pressure vessel, a high pressure steam delivery conduit connected to said internal vessel inlet stem, a branched exhaust conduit connected to said internal vessel outlet stem, one of said branches on said exhaust conduit leading to a steam trap and the other branch by-passing said steam trap to atmosphere, and a valve for selectively opening and closing said by-passing branch.

2. Apparatus as claimed in claim 1 having a low pressure steam delivery conduit and an exhaust conduit connected to said inlet and outlet stems, respectively, of said external mold, and valves for opening and closing said high and low pressure steam delivery conduits.

3. Apparatus as claimed in claim 1 having a conduit leading from said steam trap to a boiler to return hot condensate to said boiler.

4. Apparatus as claimed in claim 1 including flexible couplers forming terminal portions of said delivery and exhaust conduits for connecting said conduits to said stems.

5. Apparatus as claimed in claim 1 having a check valve in said outlet stem on said internal vessel and a valve-opening coupler attached to said exhaust conduit for detachably coupling said exhaust conduit to said exhaust stem on said internal vessel, the inlet stem on said internal vessel being unvalved.

6. A tire retreading installation comprising a boiler, a high pressure steam delivery conduit terminating in a flexible output coupler, a branch steam delivery conduit connected to said high pressure delivery conduit and terminating in a second flexible output coupler, a pressure reducing valve in said branch conduit for reducing the steam pressure, return conduits leading to said boiler, both of said return conduits having flexible coupler inlets, one of said return conduits having a by-pass conduit exhausting to the atmosphere, valves for opening and closing each delivery conduit and a separate valve for selectively opening and closing said by-pass exhaust conduit, said high pressure delivery conduit coupler and said by-pass return conduit coupler being adapted to be coupled to separate inlet and outlet stems, respectively, of an internal inflatable pressure vessel and said other delivery conduit coupler and said other return conduit coupler being adapted to be coupled to inlet and outlet stems, respectively, of an external rigid mold surrounding said internal vessel.

References Cited
UNITED STATES PATENTS

| | | | |
|---|---|---|---|
| 2,253,792 | 8/1941 | Leavenworth | 18—6 |
| 2,324,981 | 7/1943 | Bosomworth | 18—6 X |
| 2,389,178 | 11/1945 | Blount et al. | 18—6 |
| 2,791,805 | 5/1957 | White | 18—18 |
| 2,826,783 | 3/1958 | Robbins | 18—18 |
| 2,835,921 | 5/1958 | White | 18—18 |
| 2,855,629 | 10/1958 | Barefoot | 18—18 |
| 2,989,779 | 6/1961 | White | 18—18 |
| 3,091,802 | 6/1963 | Rawls | 18—2 |
| 3,118,181 | 1/1964 | Cork | 18—18 |
| 3,127,460 | 3/1964 | Freeman | 264—315 |
| 3,154,814 | 11/1964 | Fike | 18—18 |

FOREIGN PATENTS 18,261 2/1929 Australia.

J. SPENCER OVERHOLSER, *Primary Examiner.*

ALEXANDER H. BRODMERKEL, *Examiner.*

J. HOWARD FLINT, Jr., R. B. MOFFITT,
*Asssistant Examiners.*